Dec. 18, 1923. 1,478,206

G. DE BÉTHUNE

APPARATUS FOR CONDENSING DISTILLED VAPORS

Filed May 12, 1923

Inventor
Gaston de Béthune
By
Stockbridge & Borst
attys.

Patented Dec. 18, 1923.

1,478,206

UNITED STATES PATENT OFFICE.

GASTON DE BÉTHUNE, OF BRUSSELS, BELGIUM.

APPARATUS FOR CONDENSING DISTILLED VAPORS.

Application filed May 12, 1923. Serial No. 638,442.

*To all whom it may concern:*

Be it known that I, GASTON DE BÉTHUNE, citizen (or subject) of the King of the Belgians, residing at Brussels, in the Kingdom of Belgium, have invented certain new and useful Improvements in Apparatus for Condensing Distilled Vapors, of which the following is a specification.

This invention relates to improvements in apparatus for condensing distilled vapors and comprises apparatus by means of which automatically the temperature and the pressure can be lowered gradually and to a predetermined extent so as to condense the products within any desired limits of temperature.

The apparatus is chiefly characterized by a series of tubes mounted one within the other to form concentric chambers through which the vapor to be condensed passes in succession, the temperature and the pressure of the said vapor being lowered by its passage through each chamber.

In these conditions, the vapors circulating in the various chambers are condensed by contact with the walls, and the products of condensation from each chamber may be collected at the lower end of the latter.

A set of concentric tubes is provided constituting chambers through which the vapor passes. Such a set can form a complete condensing apparatus, or several sets can be arranged in concentric chambers so that the vapors to be condensed are caused to flow through them either in series or in parallel.

Constructions according to the invention are illustrated by way of example in the accompanying drawing.

Figure 1:
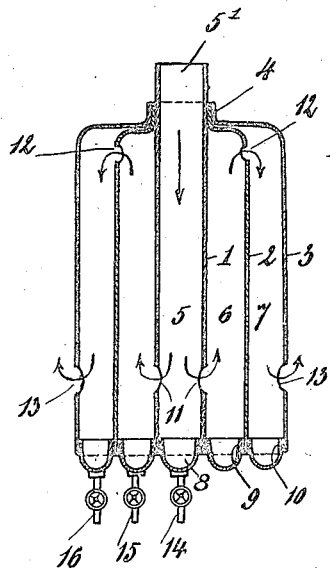
Figure 1 shows diagrammatically in vertical section and Figure 2 shows in horizontal section, a one-element apparatus.

In the construction shown in Fig. 1, the apparatus comprises three concentric tubes, 1, 2 and 3 connected together at one end 4 by a gas-tight joint and forming together concentric chambers 5, 6, 7 closed at the lower end by cups 8, 9 and 10 which form gas tight joints with the tubes and which collect the products of condensation.

In the said construction the central tube 1 forming the chamber 5, is connected to an inlet 5', under atmospheric or higher pressure. The wall of the tube 1 is provided at its lower end with openings or ports 11 functioning as outlets from the chamber 5 and inlets to the chamber 6 constituted by the tube 2.

The latter is provided at the upper portion adjoining the main inlet 5' with further openings or ports 12 forming outlets from the chamber 6 and inlets to the chamber 7 constituted by the third tube.

The vapors to be condensed enter the central chamber 5 through the inlet 5' leave it through the ports 11, enter the chamber 6 and thence pass into the chamber 7 through the ports 12 from which they escape through the ports 13 of the tube 3, either into the atmosphere or into a suitable chamber which may be connected to an exhauster if necessary.

While the vapors are circulated as above described, the products of condensation are collected in the cups 8, 9 and 10 and separately discharged through pipes 14, 15 and 16.

Except for the inlet to the first chamber, and the outlet from the last chamber 13, an inlet to a chamber constitutes the outlet of the preceding chamber.

The direction of flow of the vapors is thus reversed every time the said vapors enter a fresh chamber.

The temperature is thus lowered gradually and to a predetermined extent by the flow of the vapor from one chamber to the other. As soon as the apparatus is working fully the temperature lowers automatically at fixed points in the temperature scale, in such a manner that if the temperature of the vapor when entering the first chamber is $t^0$, the passage through the first chamber reduces it from $t^0$ to $t^1$, through the second chamber from $t^1$ to $t^2$ and so on until a temperature of $t^d$ is reached in the last chamber, which latter temperature can be maintained constant, by supplying a heating or cooling medium to a casing or jacket surrounding the last tube.

The pressure may be lowered simultaneously with the temperature. The working of the apparatus is therefore controlled by the combined action (1) of the variations of volume which are functions of the geometric dimensions of the various chambers, and (2) of the absorption of heat or of the radiation by the walls of the tubes.

As generally speaking the volume of any chamber is greater than that of the preceding chamber, the temperature and pressure of the vapor are reduced owing to expansion. On the other hand, contact with the warmer wall of the preceding chamber, results in increasing the said temperature and pressure.

The heat taken from a particular wall is however partially transferred to the wall of the next tube which is at a lower temperature.

The action of radiation may be accelerated or retarded at will by providing the tubes or a particular tube with a jacket or casing for the conveyance of heat or for cooling until the required temperature is reached.

It will be understood that by combining the two effects hereinbefore specified, it is possible to determine for each chamber two fixed limits of temperature ($ta$ at the inlet and $te$ at the outlet) as close together as may be desired, so that the products to be condensed can be obtained within these limits provided that the factors of temperature, pressure and rate of flow prevailing at the inlet to the first chamber, and at the outlet from the last, are suitably determined.

The area of the openings or ports between one chamber and the next may be such as to produce, or not, a wire-drawing action upon the vapor to be distilled. If the vapor enters the first chamber at atmospheric pressure, it is caused to leave the last chamber by means of an exhauster. As an alternative, the vapor may be supplied under pressure to the first chamber; in such a case the said vapor leaves the last one at atmospheric pressure, or is drawn therefrom by an exhauster.

The apparatus described in the foregoing may either be self-contained or may be one of a number of elements of a condensing apparatus. In the latter case several elements are combined and the vapors to be condensed pass through the elements successively.

Figure 4:
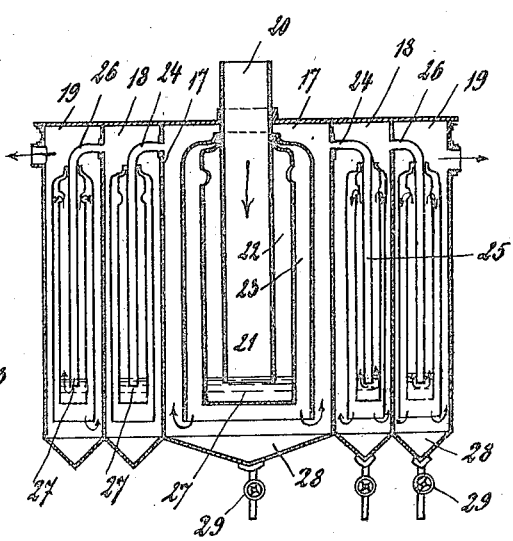
Figure 2:
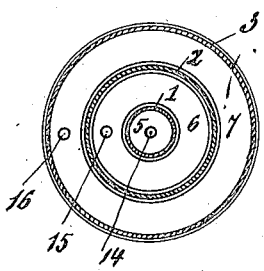
Figure 3:
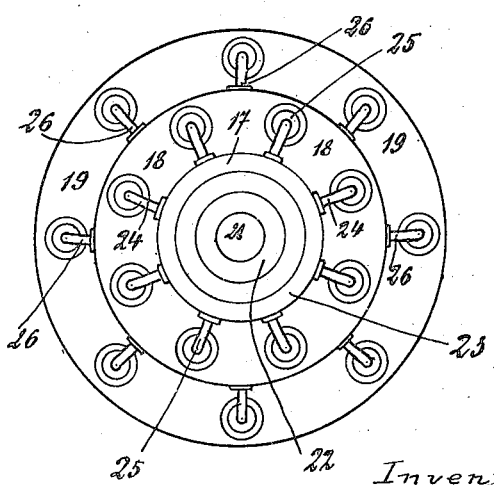
Figure 3 shows diagrammatically in plan and Fig. 4 in vertical section, an apparatus comprising a number of elements similar to that shown in Fig. 1, these various elements being mounted in concentric chambers through which pass successively the vapors to be condensed.

Figures 3 and 4 show a construction of an apparatus with a number of elements. In the said construction the whole apparatus is constituted by three successive chambers 17, 18 and 19, each containing elements constructed as hereinbefore described. The central chamber 17 contains a main element whilst the concentric chambers 18 and 19 each contain elements of smaller dimensions intended to increase the efficiency of the apparatus.

The vapors pass through the main inlet 20 into the central tube of the element in the chamber 17. They flow thereafter through the chambers 21, 22 and 23 and on escaping from the chamber 23, rise between the wall of the latter and the wall of the chamber 17 and pass through a number of inlet pipes 24 into chambers 25 mounted in parallel in the chamber 18. On their escape from each element contained in the chamber 18, the vapors rise in the latter along its outer wall and pass ultimately through the inlet pipes 26 into the elements arranged in the chamber 19 whence they finally escape through a suitable discharge device.

In this construction, the products of condensation in the various chambers of each element are not collected separately and discharged as in the case of element shown in Fig. 1, but they are emulsified by the vapor escaping from the central chamber of each element for instance at 27. The presence of fine emulsified drops in each element increases here in a very large proportion the surface on which the condensation of new products takes place. The products condensed in each principal chamber 17, 18, 19 are collected at the lower portion 28 of the said chambers and discharged through pipes 29.

The various elements may obviously be connected in series so that the vapors pass through them successively.

In the constructions described, each element is supposed to comprise an odd number of tubes. However if the number of tubes is even the inlet will be at the lower end of the central tube.

It is clear that the working of the apparatus may be watched by providing thermometers at suitable points in the chamber.

What I claim is:

1. In an apparatus of the kind described condensing elements comprising tubes arranged one within the other and forming a central chamber and concentric surrounding chambers, a multiplicity of said elements being mounted in principal concentric chambers whereby the vapors circulating through the principal concentric chambers are caused to circulate through the said condensing elements before passing from one principal chamber to the next principal concentric chamber.

2. In an apparatus of the kind described, tubes arranged one within the other and forming concentric chambers of gradually increased volume from the inside to the outside of the apparatus and condensing elements arranged in the said chambers, each condensing element comprising concentric tubes the said condensing elements, acting in parallel to each other and in series with the concentric chambers, a vapor inlet admitting the vapors to be condensed in the chamber at the center of the apparatus whereby the vapors are caused to circulate through the apparatus from the inside to the outside and means whereby the products of condensation of the vapors are discharged from the lower part of the concentric chambers.

3. In a condensing element of the kind described three concentric tubes comprising a central inlet tube extending near the bottom of a second concentric tube, the said second tube being closed at its lower end and open at its upper end, whereby products of condensation are retained in the said second tube to be emulsified by the circulating vapors, and a third concentric tube closed at its upper end and open at its lower end, whereby the vapors and products of condensation are discharged from the lower end of the said third concentric tube.

In testimony whereof, I have signed my name to this specification at Brussels, this 25th day of April, 1923.

GASTON DE BÉTHUNE.

Witnesses:
J. BERDEN.
F. Y. ZOONY.